United States Patent
Sakata et al.

(10) Patent No.: US 7,032,699 B2
(45) Date of Patent: Apr. 25, 2006

(54) DRIVE TRANSMISSION APPARATUS FOR VEHICLE AND A FOUR-WHEEL DRIVE VEHICLE

(75) Inventors: Takatoshi Sakata, Yamatotakada (JP); Kouji Yoshinami, Kashiwara (JP); Kazuo Kanazawa, Mitaka (JP); Mamoru Murakami, Mitaka (JP)

(73) Assignees: JTEKT Corporation, Osaka (JP); Fuji Heavy Industries Ltd., Tokyo (JP)

( * ) Notice: Subject to any disclaimer, the term of this patent is extended or adjusted under 35 U.S.C. 154(b) by 52 days.

(21) Appl. No.: 10/458,363

(22) Filed: Jun. 11, 2003

(65) Prior Publication Data

US 2004/0251070 A1    Dec. 16, 2004

(51) Int. Cl.
*B60K 17/354*    (2006.01)

(52) U.S. Cl. ..................................... 180/247
(58) Field of Classification Search ................ 180/233, 180/247–250
See application file for complete search history.

(56) References Cited

U.S. PATENT DOCUMENTS

| | | | | |
|---|---|---|---|---|
| 4,905,808 A | * | 3/1990 | Tomita et al. | 192/85 AA |
| 4,941,541 A | * | 7/1990 | Ito et al. | 180/414 |
| 5,036,264 A | * | 7/1991 | Ueki | 318/254 |
| 5,182,499 A | * | 1/1993 | Inaji et al. | 318/254 |
| 5,563,481 A | * | 10/1996 | Krause | 318/254 |
| 6,105,703 A | * | 8/2000 | Kuroda et al. | 180/248 |
| 6,342,770 B1 | * | 1/2002 | Stephan et al. | 318/254 |
| 6,448,736 B1 | * | 9/2002 | Lajsner et al. | 318/701 |
| 6,703,807 B1 | * | 3/2004 | Sakata et al. | 318/700 |

FOREIGN PATENT DOCUMENTS

| | | |
|---|---|---|
| JP | 5-345534 | 12/1993 |
| JP | 9-142165 | 6/1997 |
| JP | 2001-213185 | 8/2001 |
| JP | 2002-247882 | 8/2002 |

* cited by examiner

*Primary Examiner*—Kevin Hurley
(74) *Attorney, Agent, or Firm*—Smith, Gambrell & Russell, LLP

(57) ABSTRACT

Providing a drive transmission apparatus for vehicle capable of ensuring the adaptability of an electric motor to a high-temperature environment and increasing the degree of freedom for apparatus layout. The drive transmission apparatus for vehicle serves to distribute a drive force generated by a rotary drive source 2 between drive wheels 6, 12, and includes: an input member 7 applied with the drive force from the rotary drive source 2; an output member 9 for outputting the drive force to the drive wheels 12; a hydraulic clutch 21 for hydraulically performing drive transmission/transmission cut-off between the input member 7 and the output member 9; an oil pump 31 for applying a hydraulic pressure to the hydraulic clutch 21; and a sensorless brushless motor for driving the oil pump.

11 Claims, 8 Drawing Sheets

DRIVE TRANSMISSION APPARATUS FOR VEHICLE AND A FOUR-WHEEL DRIVE VEHICLE

BACKGROUND OF THE INVENTION

The present invention relates to a drive transmission apparatus for vehicle operative to distribute a drive force between front and rear drive wheels or between left and right drive wheels, as well as to a four-wheel drive vehicle.

There is known a permanent four-wheel drive vehicle wherein a drive transmission apparatus is disposed on a drive-force transmission path between the front and rear wheels for varying a distribution ratio of the drive force between the front and rear wheels according to a running state of the vehicle, thereby varying torques transmitted to the front and rear wheels.

There is also proposed a four-wheel drive vehicle which further includes a drive transmission apparatus disposed on a drive-force transmission path between the right and left wheels so that the distribution ratio of the drive force is varied not only between the front and rear wheels but also between the right and left wheels.

A multiple disc clutch is employed as a device for transmitting the drive force to the front and rear wheels or to the right and left wheels. The multiple disc clutch includes an electromagnetic type adapted to switch ON or OFF the drive transmission based on an electromagnetic force, and a hydraulic type adapted to switch ON or OFF the drive transmission based on a hydraulic pressure.

In comparison between the electromagnetic type and the hydraulic type, the electromagnetic type is inferior in clutching feeling because the operation mechanism thereof involves the occurrence of speed change shock at each switch-on or switch-off of the clutch. On the other hand, the hydraulic type has a superior clutching feeling than the electromagnetic type.

Therefore, the use of the hydraulic type is recommended from the viewpoint of clutching feeling.

Where the multiple disc clutch is of the hydraulic type, an oil-hydraulic circuit is necessary. Conventionally, a feed oil to the multiple disc clutch is drawn from a transmission or the like, whereas an oil pump for the oil-hydraulic circuit is driven by an engine.

Where the oil pump is driven by the engine, however, the oil pump produces an additional load on the engine, resulting in a poor fuel economy.

On this account, the oil pump is desired to be an electric pump driven by an electric motor rather than by the engine.

Unfortunately, the electric motor employed by the conventional electric pump is a brush motor, which is detrimentally vulnerable to high temperatures. In a case where, for example, the brush motor is located in the vicinity of the multiple disc clutch, the brush motor is exposed to a high-temperature environment because the multiple disc clutch is located in the proximity of the transmission, a differential gear and the like, which are heated to 120° C. or more. In the high-temperature environment, the brush motor suffers serious brush wear so as to be significantly reduced in the service life thereof when it is rotated continuously.

In order to avoid the brush wear, it may be contemplated to employ an electric brushless motor with a sensor. The brushless motor with a sensor is a brushless motor equipped with a sensor for sensing an angular position of a rotor.

However, the brushless motor with a sensor is still unsuited for use in the high-temperature environment because the sensor has poor high-temperature durability.

Thus, every type of motor is vulnerable to the high-temperature environment. Accordingly, where the electric pump is employed as the oil pump serving as a hydraulic pressure source for operating the multiple disc clutch, the electric motor must be located at place remote from the multiple disc clutch and of low temperatures, rather than in the vicinity of the multiple disc clutch located in the high-temperature area.

However, such a layout requires an oil piping for interconnecting the multiple disc clutch and the electric motor, the oil piping requiring an extra space therefor. Consequently, the drive transmission apparatus has a lower degree of freedom for layout and also suffers a reduced efficiency because of an increased pressure loss associated with the oil piping.

SUMMARY OF THE INVENTION

In accordance with the invention, a drive transmission apparatus for vehicle operative to distribute a drive force generated by a rotary drive source to drive wheels comprises: an input member applied with the drive force from the rotary drive source side; an output member for outputting the drive force to the drive wheel side; a hydraulic clutch for hydraulically carrying out drive transmission/transmission cut-off between the input member and the output member; and an oil pump for applying a hydraulic pressure to the hydraulic clutch, and is characterized by that the oil pump is driven by a sensorless brushless motor.

The sensorless brushless motor is free from the brush wear, featuring a longer service life than the brush motor even if exposed to the high-temperature environment. Having no sensor, the sensorless brushless motor can operate in the high-temperature environment. Thus, the electric motor for the oil pump, which is constituted by the sensorless brushless motor, is improved in the adaptability to the high-temperature environment. This negates the need for locating the electric motor at place remote from the area of high temperatures such as of the transmission and the differential gear and hence, a higher degree of freedom for apparatus layout results. For instance, it is also possible to accomplish space savings by omitting or shortening the oil piping while locating the oil pump near the hydraulic clutch.

The drive transmission apparatus can serve the dual purposes of distributing the drive force between the front and rear wheels and of distributing the drive force between the right and leftwheels. In the case of the distribution of the drive force between the front and rear wheels, the input member may be connected to main drive wheels while the output member may be connected to an auxiliary drive wheel so that the hydraulic clutch may distribute a part of the drive force applied to the main drive wheels to the auxiliary drive wheel.

In the case of the distribution of the drive force between the right and left wheels, it is preferred that the hydraulic clutch for distributing the drive force from the rotary drive source between the right and left drive wheels is disposed at a respective place between the input member driven by the rotary drive source and each of the right and left drive wheels or at place between the input member and either one of the right and left drive wheels.

Furthermore, if the oil pump has a start-up time of 0.2 seconds or less to achieve, from a stand-still state, a required level of hydraulic pressure for operating the hydraulic clutch, the hydraulic clutch is allowed to carry out high-speed, high-precision distribution of the drive force.

The hydraulic clutch may preferably be adjusted for drive transmission ratio by regulating the hydraulic pressure applied to the hydraulic clutch. It is preferred that the hydraulic pressure is regulated via control of a hydraulic pressure output of the oil pump, and that the hydraulic pressure output of the oil pump is controlled via control of the sensorless brushless motor.

Furthermore, it is preferred that the hydraulic pressure is regulated via control of the hydraulic pressure output of the oil pump, and that the oil pump is activated when the drive transmission ratio is adjusted but is deactivated when the drive transmission ratio is not adjusted. The deactivation of the oil pump leads to an increased efficiency of the drive transmission.

In accordance with the invention, a four-wheel drive vehicle comprises: an engine; right- and left-front wheels applied with an engine output; a front-wheel side differential gear for distributing the engine output between the right- and left-front wheels; right- and left-rear wheels applied with the engine output; a rear-wheel side differential gear for distributing the engine output between the right- and left-rear wheels; a hydraulic clutch interposed between the front-wheel side differential gear and the rear-wheel side differential gear for adjustment of a distribution ratio of the engine output between the front and rear wheels; an oil pump for applying a hydraulic pressure to the hydraulic clutch; and a sensorless brushless motor for driving the oil pump. The adaptability to high-temperature conditions is enhanced by the sensorless brushless motor for driving the oil pump.

The hydraulic clutch may be used for adjusting a distribution ratio of the engine output between the right- and left-front wheels or between the right- and left-rear wheels.

An alternative arrangement may be made such that the distribution ratio of the engine output between the front and rear wheels is adjusted by a first hydraulic clutch interposed between the front-wheel side differential gear and the rear-wheel side differential gear, and that the distribution ratio of the engine output between the right- and left-front wheels or between the right- and left-rear wheels is adjusted by a second hydraulic clutch.

DETAILED DESCRIPTION OF THE PREFERRED EMBODIMENTS

The invention will hereinbelow be described in details with reference to the accompanying drawings illustrating the preferred examples thereof.

Figure 1:
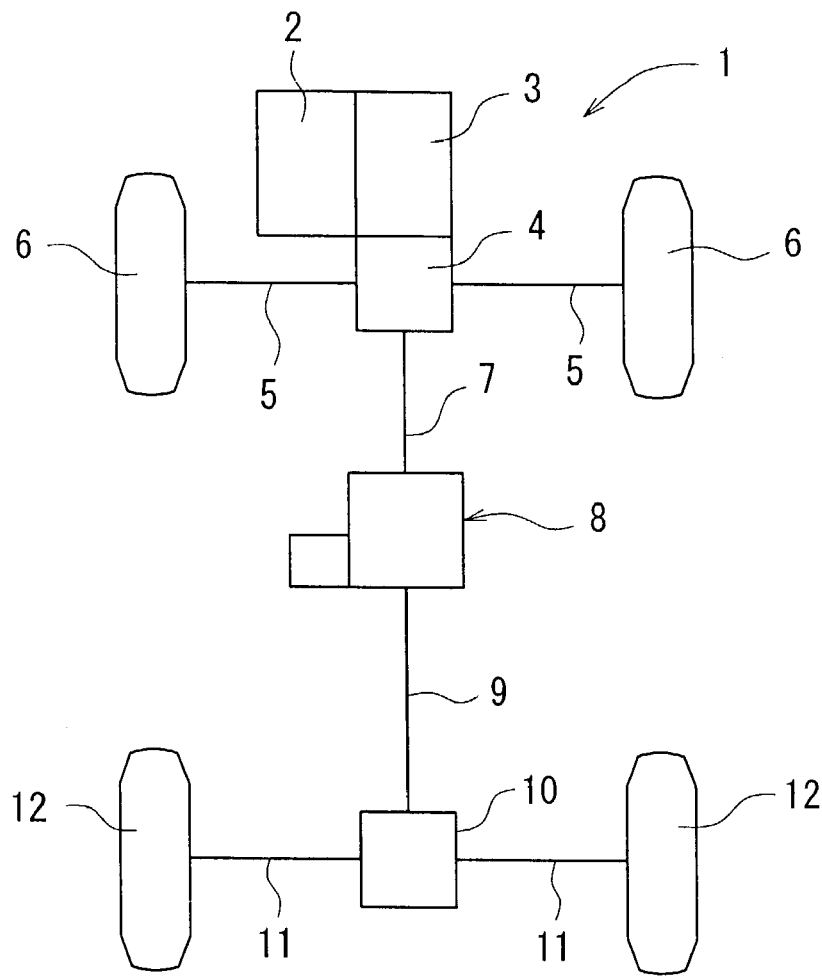
FIG. 1 is a diagram showing an arrangement of a four-wheel drive vehicle including a drive transmission apparatus of the invention.

As shown in FIG. 1, an engine 2 as a rotary drive source is mounted to a four-wheel drive vehicle 1 at a front part of a vehicle body thereof. An output of the engine 2 is inputted to a front-wheel side differential portion (differential gear) 4 via a transmission 3. An output of the front-wheel side differential portion 4 is transmitted to front wheels 6, 6 via front-wheel drive shafts 5, 5 so that the front wheels 6, 6, as main drive wheels, are brought into motion.

The output of the engine 2 is transmitted to an input shaft 7 extended longitudinally of the vehicle body via the front-wheel side differential portion 4 so as to be inputted to a drive transmission apparatus 8. An output of the drive transmission apparatus 8 is transmitted to an output shaft 9. According to the embodiment, the input shaft 7 serves as an input member of the drive transmission apparatus 8, whereas the output shaft 9 serves as an output member of the drive transmission apparatus 8. An output of the drive transmission apparatus 8 is applied to a rear-wheel side differential portion 10 via the output shaft 9. In other words, the output of the engine 2 is transmitted from the front-wheel side differential portion 4 to the rear-wheel side differential portion 10 via the input and output shafts 7, 9 as transmission shafts.

An output of the rear-wheel side differential portion 10 is transmitted to rear wheels 12, 12 via rear-wheel drive shafts 11, 11, thereby bringing the rear wheels 12, 12, as auxiliary drive wheels, into motion.

When the vehicle is running at a constant speed, the drive transmission apparatus 8 distributes all the drive force from the engine 2 to the front wheels 6, 6, transmitting no drive force to the rear wheels 12, 12. During vary fast start, acceleration, skids or the like, the drive transmission apparatus provides a variable distribution of the drive force to the rear wheels 12, 12, as well. In this manner, the drive transmission apparatus performs an optimum torque distribution between the front and rear wheels. The torque distribution is optimized under electronic control of a control unit not shown.

Figure 2:
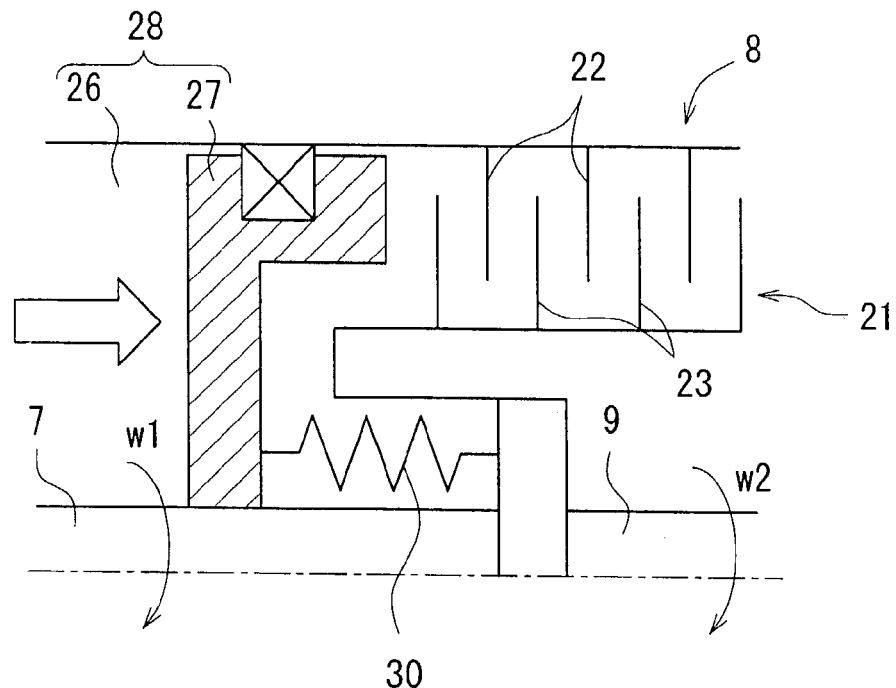
FIG. 2 is a diagram showing an arrangement of the drive transmission apparatus.

FIG. 2 schematically illustrates an arrangement of the drive transmission apparatus 8, which is incorporated in a clutch housing (not shown) and includes a wet type multiple disc clutch (hydraulic clutch) 21. The multiple disc clutch 21 includes first clutch discs 22 rotatable in unison with the input shaft 7, and second clutch discs 23 rotatable in unison with the output shaft 9 and axially slidably movable. The first clutch discs 22 and the second clutch discs 23 are brought into engagement thereby transmitting a drive force ω1 from the input shaft 7 to the output shaft 9. On the other hand, the first clutch discs 22 and the second clutch discs 23 are brought out of engagement thereby cutting off the transmission of the drive force.

In normal state such as when the vehicle is running at normal speeds, the first clutch discs 22 and the second clutch discs 23 of the multiple disc clutch 21 are disengaged from each other such that multiple disc clutch 21 does not transmit the drive force from the input shaft 7 to the output shaft 9. The multiple disc clutch 21 is adapted to transmit the drive force by way of the second clutch discs 23 hydraulically pressed against the first clutch discs 22. Furthermore, the multiple disc clutch is adapted to vary a drive transmission ratio by regulating the pressing force against the clutch discs via hydraulic pressure regulation. In short, the multiple disc clutch is capable of varying a drive force ω2 outputted from the output shaft 9. That is, the distribution ratio of the drive force between the front and rear wheels 6, 12 can be controlled by regulating the hydraulic pressure.

For the purpose of pressurizing the multiple disc clutch 21, the drive transmission apparatus 8 includes a cylinder 28 having an oil-hydraulic chamber 26 and a piston 27 hydraulically driven by hydraulic fluid in the oil-hydraulic chamber 26. The piston 27 is biased by a biasing member (return spring) 30 in an opposite direction to the pressing force (leftwardly as seen in FIG. 2). The hydraulic pressure of the oil-hydraulic chamber 26 axially moves the piston 27 against the biasing force of the biasing member 30, thereby pressurizing the second clutch discs 23. When the piston 27 presses the second clutch discs 23, the second clutch discs 23 are engaged with the first clutch discs 22, so that the drive force is transmitted from the input shaft 7 to the output shaft 9.

Figure 3:
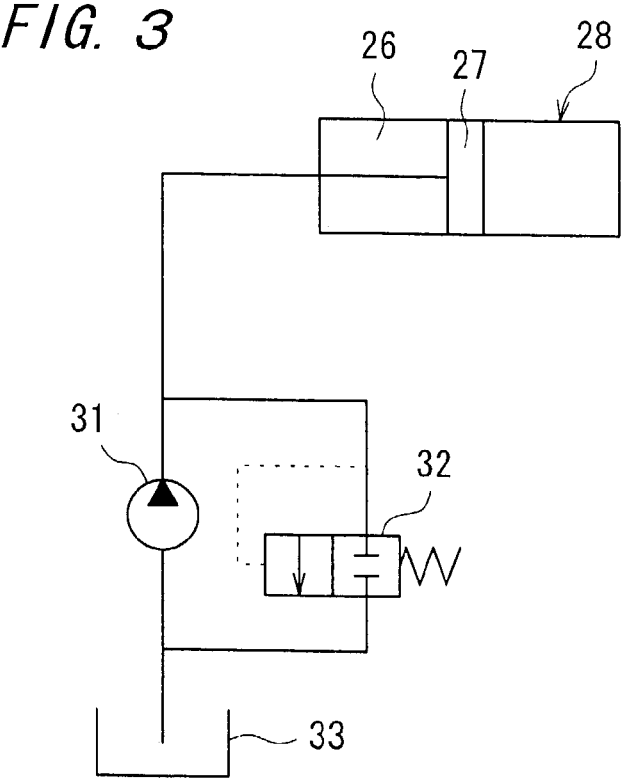
FIG. 3 is a diagram showing an oil-hydraulic circuit of the drive transmission apparatus.

FIG. 3 illustrates an oil-hydraulic circuit for feeding the hydraulic fluid to the cylinder 28. The oil-hydraulic circuit includes, besides the cylinder 28, an oil pump 31, a relief valve 32 and an oil tank 33. The oil-hydraulic circuit is disposed in the clutch housing, thus having all its components, such as the cylinder 28 and oil pump 31, located in the drive transmission apparatus 8. This negates the need for drawing the hydraulic fluid from somewhere else in the vehicle, such as a transmission of an automatic transmission vehicle (hereinafter, referred to as "AT vehicle"), and thence, for the oil piping. In a manual transmission vehicle (hereinafter, referred to as "MT vehicle"), an oil pump for transmission is not provided. Therefore, a drive transmission apparatus designed to draw the hydraulic fluid from the transmission is not applicable to the MT vehicle. Accordingly, the design of the drive transmission apparatus 8 need be changed between the AT vehicle and the MT vehicle. According to the invention, however, the drive transmission apparatus 8 of the same design is applicable to both the AT vehicle and the MT vehicle because the oil-hydraulic circuit for the drive transmission apparatus 8 is incorporated in the drive transmission apparatus 8.

An outlet port of the oil pump 31 is in direct connection with the cylinder 28 thus forming a closed circuit configuration. When the oil pump 31 operates to apply the hydraulic pressure to the cylinder 28, the piston 27 pressurizes the second clutch discs 23. When the oil pump 31 is deactivated, the piston 27 is returned by the biasing member 30 in the opposite direction to the pressing direction. The hydraulic pressure applied to the piston 27 is regulated via control of the hydraulic pressure (hydraulic pressure output) generated by the oil pump 31, while the hydraulic pressure output is controlled via control of the rotation of the electric motor for driving the oil pump 31.

Figure 4:
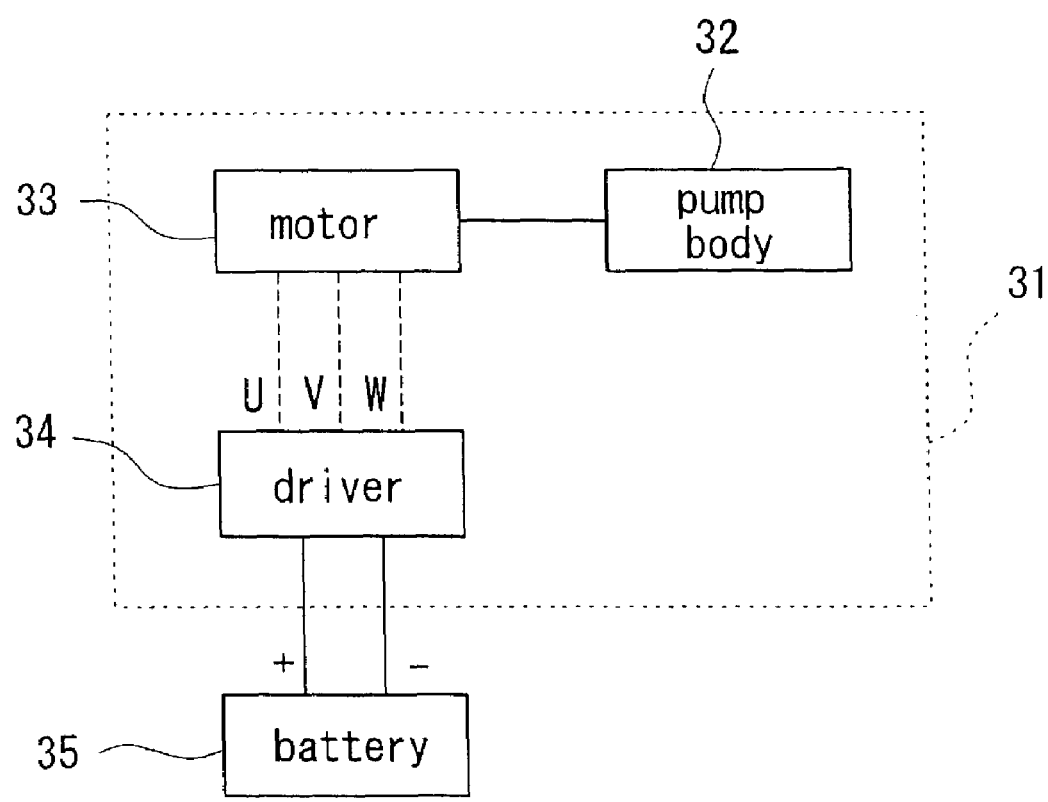
FIG. 4 is a block diagram showing an arrangement of an electric pump unit for a hydraulic pressure source of the drive transmission apparatus.

FIG. 4 is a schematic diagram showing an arrangement of the oil pump 31. The oil pump 31 includes a pump body 32, a motor 33 for driving the pump body 32, and a driver 34 dedicated to the motor 33, the driver 34 and the motor 33 operating on electric power supplied from a battery 35.

The oil pump 31, which is an electric pump driven by an electric motor, employs a sensorless brushless motor serving as the motor 33 and driver 34 (activation control unit). Specifically, the sensorless brushless motor employs a synchronous motor, but includes no sensor for sensing the angular position of a rotor. The synchronous motor 33 is always operated at high efficiency by the driver 34 so as to exhibit characteristics equivalent to those of a DC motor. The sensorless brushless motor is also assembled in the clutch housing.

The drive transmission apparatus 8 is disposed in the vicinity of the transmission 3 or the gears of the differential portion 4, thus exposed to the high-temperature environment. However, the drive transmission apparatus can ensure a long service life and stable operations because the motor is of the sensorless brushless type. This permits, as described above, the oil pump 31 to be assembled in the clutch housing for omission of the piping. Furthermore, the sensorless brushless motor can operate over an extended period of time even in the high-temperature environment and hence, the oil pump 31 may be disposed at any place regardless of whether it is in the high-temperature environment or not. This leads to a higher degree of freedom for apparatus layout.

Figure 5:
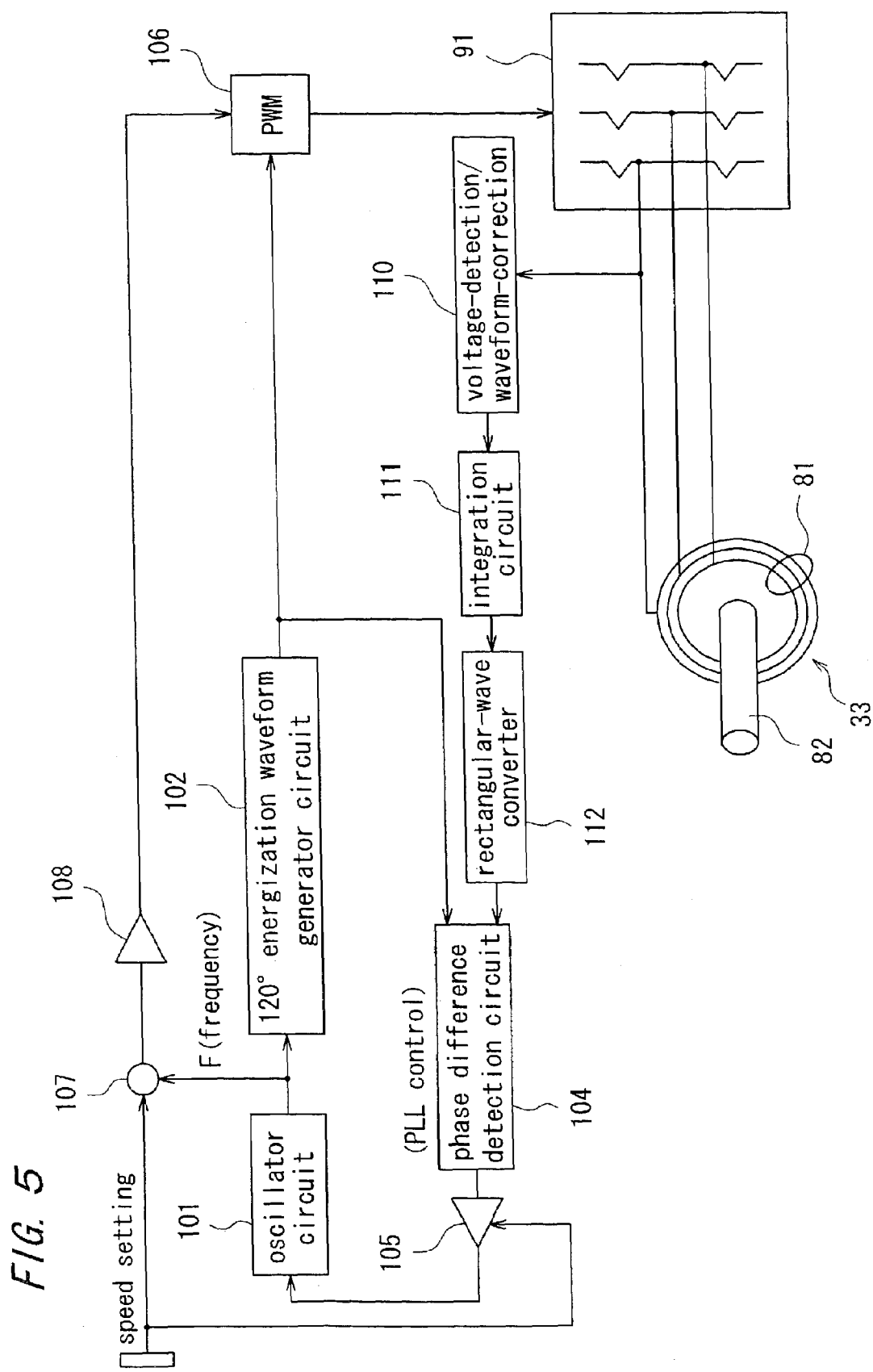
FIG. 5 is a block diagram showing an arrangement of a sensorless brushless motor.

As shown in FIG. 5, the synchronous motor 33 includes an armature (rotor) 82 and a field coil 81. The field coil 81 of the synchronous motor 33 is applied with an AC current at a predetermined frequency by a three-phase inverter circuit 91. A voltage at an end of the field coil 81 is detected by a voltage-detection/waveform-correction circuit 110, whereas the detected voltage is subjected to waveform correction such as to identify a component of a voltage waveform associated with a counter electromotive force, as will be described hereinlater.

The corrected voltage waveform is sent to an integration circuit 111 so as to be integrated, and then subjected to a rectangular-wave converter circuit 112 so as to be converted into a rectangular wave. The resultant rectangular wave is applied, as one input, to a phase difference detection circuit 104.

On the other hand, an oscillator circuit 101 (which may be constituted by, for example, a VCO (Voltage Controlled Oscillator)) provides an output to a 120° energization waveform generator circuit 102 which, in turn, generates a 120° energization waveform for controlling the synchronous motor 33. This waveform is applied to a PWM (Pulse Width Modulation) circuit 106 which provides an output to control the inverter circuit 91.

A phase of the voltage may be taken out from the output of the 120° energization waveform generator circuit 102. The voltage phase thus taken out is applied, as the other input, to the phase difference detection circuit 104. The phase difference detection circuit 104 provides an output by determining a phase difference between the output from the rectangular-wave converter circuit 112 and that of the 120° energization waveform generator circuit 102. The phase difference is amplified by a differential amplifier 105 so as to be fed back to the oscillator circuit 101. Based on this, the oscillation frequency of the oscillator circuit 101 is controlled.

In this manner, the counter electromotive force developed in the voltage at the end of the field coil 81 of the synchronous motor 33 is fed back to a control signal applied to the inverter circuit 91. Therefore, immediately after the occurrence of a counter electromotive force, the output of the 120° energization waveform generator circuit 102 is adjusted based on the counter electromotive force, so that the synchronous motor 33 is placed into a commutation mode (sensorless mode) quite shortly after start-up.

In the circuit shown in FIG. 5, a gain of the differential amplifier 105 is controlled based on a speed setting signal. Specifically, the gain of the differential amplifier 105 is designed to be proportional to the speed setting signal such that the synchronous motor 33 may be apparently smoothly accelerated. In addition, a subtracter 107 determines a difference between an output frequency of the oscillator circuit 101 and a set frequency as the speed setting signal while the difference thus found is amplified by an amplifier 108 before applied to the PWM circuit 106. Thus, a crest value of the waveform generated by the 120° energization waveform generator circuit 102 is controlled.

Figure 6:
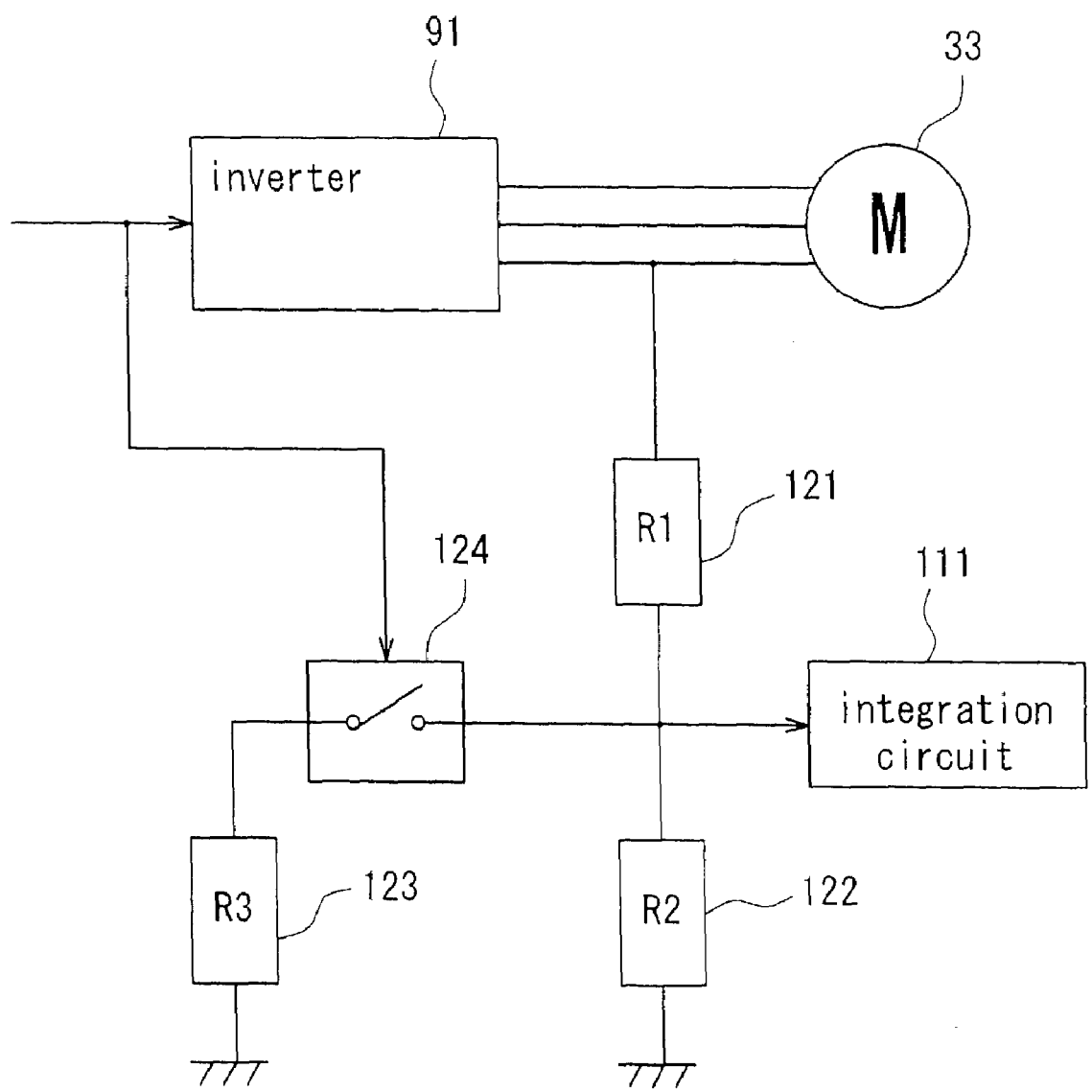
FIG. 6 is a circuit diagram showing an example of a voltage-detection/waveform-correction circuit.

FIG. 6 is a circuit diagram showing a specific example of the voltage-detection/waveform-correction circuit 110. The circuit 110 functions as voltage detection means for detecting the voltage at the end of the field coil 81 and also as waveform correction means for correcting the detected voltage so as to be less affected by a voltage waveform of the AC current applied by the inverter. As shown in FIG. 6, the voltage-detection/waveform-correction circuit 110 may be constituted by a circuit including, for example, three partial voltage resistance elements 121 to 123 and an analog switch 124. The resistance elements 121, 122 are connected in series. One end of the resistance element 121 is connected to an end of the field coil 81 of the synchronous motor 33. As open end of the resistance element 122 is grounded. Thus, a partial voltage based on a resistance ratio between the resistance elements 121, 122 can be detected as the end voltage of the field coil 81. The detected voltage is applied to the integration circuit 111 so as to be converted into an integration waveform.

According to the embodiment, the resistance element 123 is connected in parallel with the resistance element 122. In addition, the resistance element 123 is connected via the analog switch 124 such as to be brought into or out of connection at an arbitrary timing. The analog switch 124 is constituted by a non-contact switch such as a MOS transistor or the like. The analog switch 124 is switched by way of a switch signal (a signal applied by the PWM circuit 106) from the inverter 91.

According to such a configuration, the voltage division ratio of the voltage detection circuit is varied in correspondence to switch-on or switch-off of the analog switch 124. Thus, only during the time the synchronous motor 33 is supplied with the current from the inverter 91, the analog switch 124 may be switched ON to vary the voltage division ratio between the resistance elements, thereby reducing the influence on the voltage waveform posed by the current outputted from the inverter 91.

Figure 7:
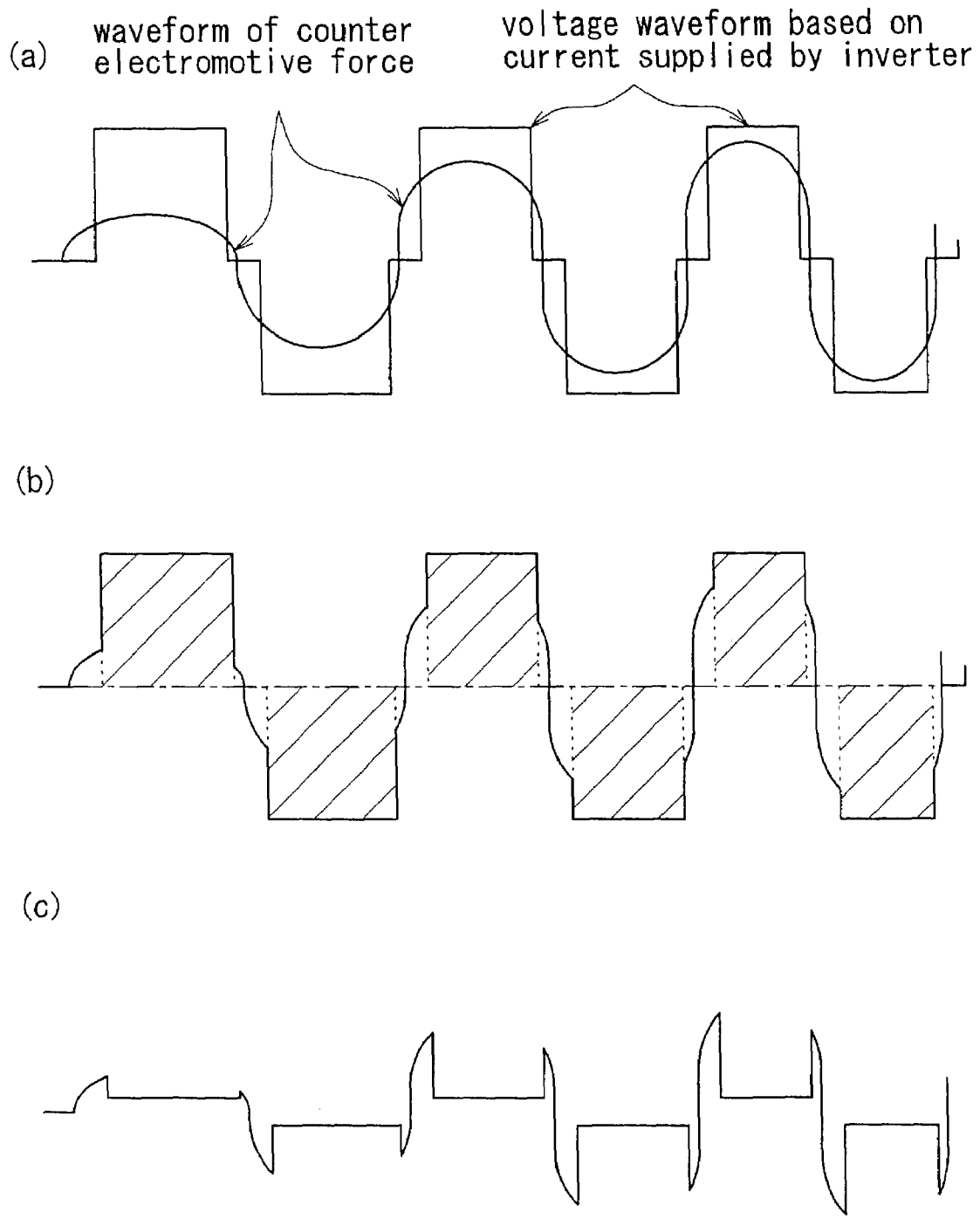
FIGS. 7(a) to 7(c) are waveform diagrams illustrative of how to correct a waveform.

As shown in FIG. 7(*a*), at the start-up of the synchronous motor 33, an AC current of a low frequency is supplied from the inventor 91 to the field coil 81 which attracts the armature (rotor) 82 so that the armature starts rotating. As the armature 82 rotates, the counter electromotive force develops. The counter electromotive force is increased in the amplitude as the armature 82 is increased in rotational speed. The voltage at the end of the field coil 81 has a waveform resulting from a voltage waveform of the AC current supplied from the inverter 91 and a voltage waveform of the counter electromotive force (FIG. 7(*b*)).

If the synthesized waveform is directly applied to the integration circuit 111, the waveform of the counter electromotive force is so small relative to the synthesized waveform that the component of the counter electromotive force hardly affects the integration waveform. Since the waveform of the AC current supplied from the inverter 91 is that of the output from the inverter 91 itself and is known, the circuit 110 as the waveform correction means may remove, from the synthesized waveform, this waveform based on the current outputted from the inverter 91, thereby identifying the component of the counter electromotive force as shown in FIG. 7(*c*).

In order that the brushless motor has a sensorless configuration, the counter electromotive force must be increased enough to be readily detected. However, the conventional sensorless brushless motor takes several seconds to establish such a state (such as called the commutation mode or sensorless mode). In the case of a sensorless brushless motor incorporated into an air conditioner as a household electric appliance, for example, the shortest time before the commutation mode is established is 2 seconds or so.

In contrast, the embodiment is adapted to reflect a phase difference (leading phase) of the counter electromotive force in the control signal to the inverter 91 even when the synchronous motor 33 is just started to rotate the armature 82 at low speed. Hence, the synchronous motor 33 can be brought into the commutation mode (sensorless mode) shortly after the start-up of the motor. The embodiment reduces the period of time elapsed before the commutation mode by a factor of tens as compared with the prior art.

Figure 8:
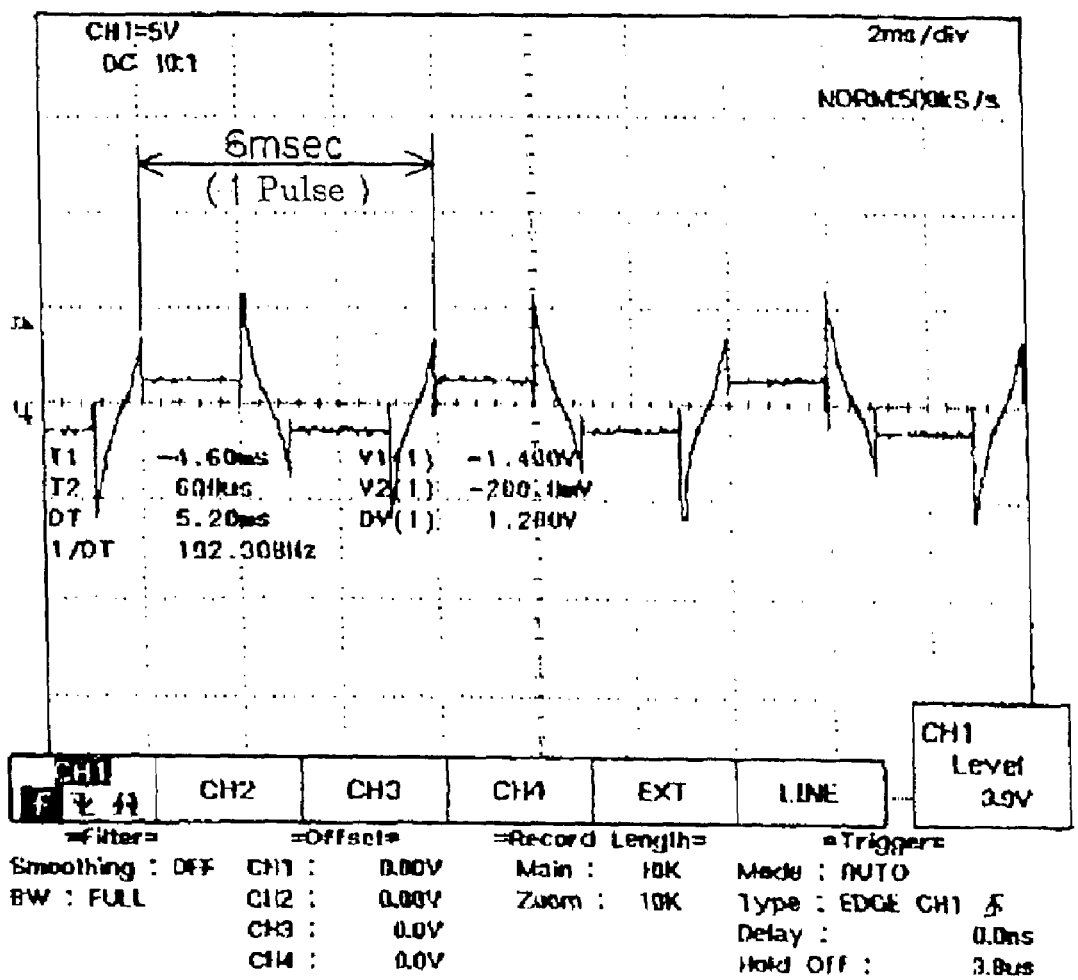
FIG. 8 is a graph representing an example of measured output waveforms so corrected as to identify a component of a voltage waveform associated with a counter electromotive force.
Figure 9:
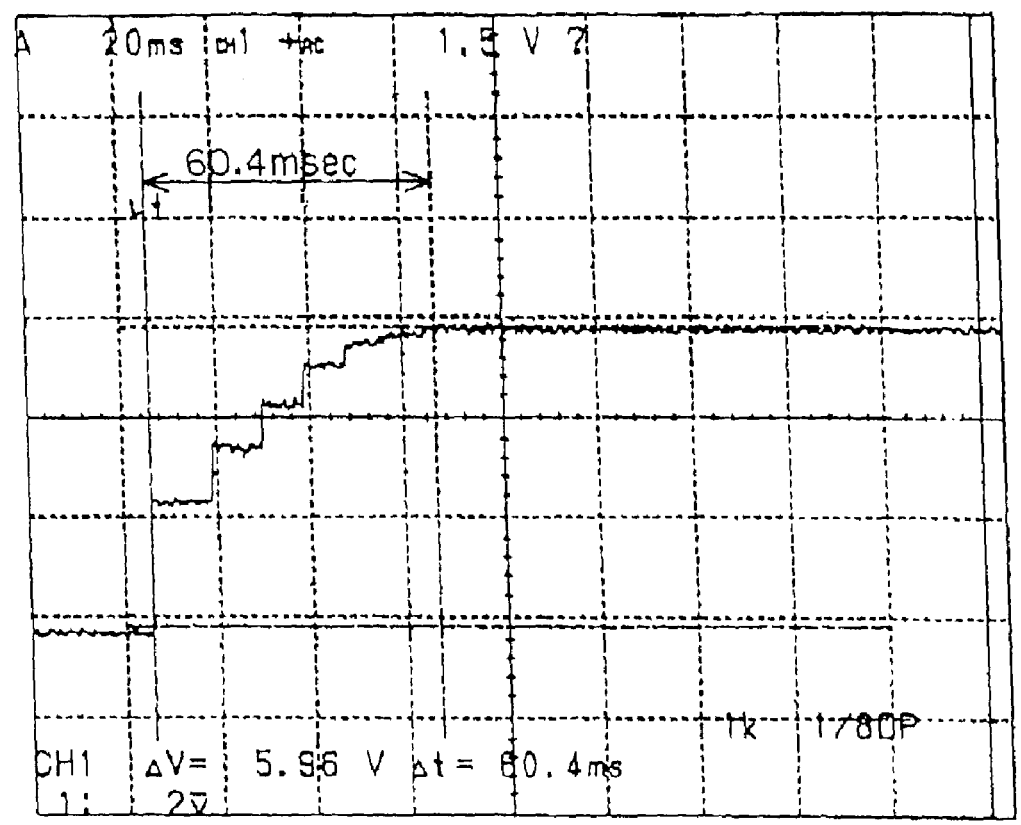
FIG. 9 is a graphical representation of measurement results of a start-up performance of the sensorless brushless motor.

FIG. 8 shows an example of measurements on corrected output waveforms. FIG. 9 shows measurements of a waveform of an 8-pole synchronous motor (maximum output: 315 W) operated on DC 42 V from a voltage source. As seen from FIG. 8, a pulse has a width of 6 msec. and hence, the number of rotation of the motor is at 2,500 rpm.

This waveform is based on measurement results of the circuit of FIG. 6 wherein the resistance element 121 (R1) has a resistance of 40 kΩ, the resistance element 122 (R2) has a resistance of 20 kΩ, and the resistance element 123 (R3) has a resistance of 3.3 kΩ.

The degree of lead in the phase of the component of the counter electromotive force is clarified by integrating the corrected voltage waveforms in the integration circuit 111. The leading phase thus determined is utilized in the feedback control.

The measurement results of the start-up performance of the synchronous motor 33 are shown in FIG. 9. The graph plots time on the abscissa and number of rotation on the ordinate for indicating how many seconds the synchronous motor takes to reach the maximum number of rotation after energization. It was confirmed from the measurement results that this sensorless brushless motor unit established the commutation mode (sensorless mode) in 0.06 seconds. Although the results are obtained from a no-load running test, time delay occurs if the pump is under load. Hence, the evaluation of the start-up performance may be represented by the results of the no-load test.

Without the provision of special mechanical hydraulic-pressure retention/supply means such as an accumulator, the oil pump 31 as driven by the aforesaid sensorless brushless motor can accomplish the reduction of time taken to be raised from a stand-still sate to a required level of hydraulic pressure for operating the multiple disc clutch 21. Specifically, the motor was able to achieve the start-up performance of 0.2 seconds or less which is required to ensure high-speed and high-precision motion of the clutch 21, the start-up performance represented by the start-up time between the stand-still state of the pump and the achievement of the predetermined level of hydraulic pressure. In addition, the motor could be further improved in the performance to 0.1 second or less, thus adapted for an even higher level of clutch control.

Therefore, the following drive transmission may be provided to the vehicle. During normal running, the oil pump 31 is deactivated by deactivating the sensorless brushless motor so that the torque is distributed between the front wheels 6 and the rear wheels 12 at a ratio of 100:0 thereby allowing the vehicle to run just as an FF vehicle. In the event of skids or the like, the sensorless brushless motor is immediately activated to start the pump 31 so that the torque is distributed to the rear wheels 12 as well, thereby allowing the vehicle to run stably based on the four-wheel drive. Specifically, when a control unit provides a torque distribution control in response to a sensor detecting the occurrence of skids, an optimum control is impossible if the drive transmission apparatus 8 (the multiple disc clutch 21) reacts slow. However, the synchronous motor 33 has such a short start-up time that the oil pump 31 is immediately activated to ensure the required level of hydraulic pressure.

Furthermore, the oil pump 31 starts acting so quickly that the oil pump 31 may normally be at rest and activated as required, thus contributing to energy savings.

Figure 10:
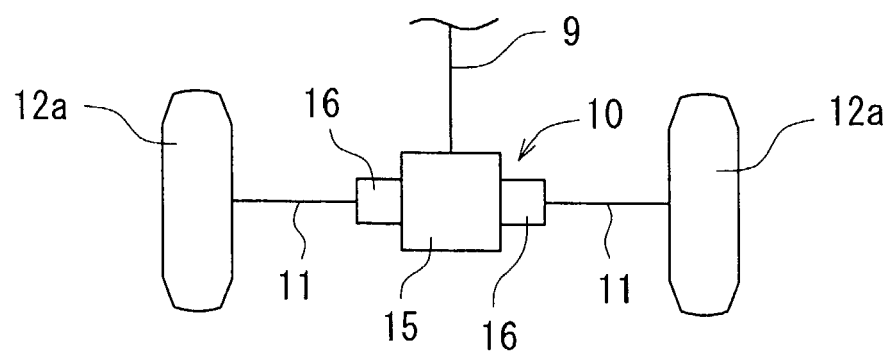
FIG. 10 is a schematic diagram showing an arrangement of another exemplary four-wheel drive vehicle.

FIG. 10 shows another example of the four-wheel drive vehicle incorporating the drive transmission apparatus of the invention. The rear-wheel side differential portion 10 includes a differential mechanism (differential gears) 15 and drive transmission apparatuses 16, 16. The differential mechanism 15 includes bevel gears and the like, and operates to transmit the drive force of the engine 2, transmitted via the output shaft 9, to the respective rear-wheel drive shafts 11, 11 as allowing for differential motion between the two rear-wheel drive shafts 11, 11. The drive transmission apparatuses 16, 16 are disposed on lateral sides of the differential mechanism 15, respectively, and provides optimum torque distributions to right- and left-rear wheels (right and left drive wheels) 12a, 12a by variably distributing the drive force from the output shaft 9 between the rear-wheel drive shafts 11, 11 on the right and left sides. According to FIG. 10, the output shaft 9 and the differential mechanism 15 constitute the input member of the drive transmission apparatus 16, whereas the rear-wheel drive shafts 11, 11 constitutes the output member of the drive transmission apparatus 16. The torque distribution between the right- and left-drive wheels 12a, 12a is also carried out under the electronic control of the control unit controlling the respective drive transmission apparatuses 16, 16 on the right and left sides.

Similarly to the drive transmission apparatus 8 shown in FIGS. 1 and 2, the drive transmission apparatus 16 also transmits the drive force or cuts off the drive transmission by way of the hydraulically operated multiple disc clutch. In contrast to the drive transmission apparatus 8 shown in FIGS. 1 and 2, the drive transmission apparatus normally permits the transmission of the drive force from the input member (the output shaft 9 and differential mechanism 15) to the output member (the rear-wheel drive shafts 11) but hydraulically cuts off the transmission of the drive force as required. Specifically, the piston 27 of FIG. 2 is biased by the biasing member 30 in the pressing direction. That is, when the hydraulic pressure is absent, the first clutch discs 22 and the second clutch discs 23 are held in engagement by the biasing force of the biasing member 30. However, a generated hydraulic pressure moves the piston 27 against the biasing force of the biasing member 30 thereby bringing the first clutch discs 22 and the second clutch discs 23 out of the engagement.

The drive transmission apparatus 16 of FIG. 10 may be mounted to the four-wheel drive vehicle 1 in addition to the drive transmission apparatus 8 of FIG. 1, or may be singly mounted to the vehicle. In the case where the drive transmission apparatus 16 of FIG. 10 is additionally mounted to the vehicle 1, it is preferred that the hydraulic clutches 21 included in the individual drive transmission apparatuses 8, 10 may independently be driven by the discrete oil pumps 31. Incidentally, the drive transmission apparatus 16 of FIG. 10 may also be mounted to the front wheel side.

It is noted that the invention should not be limited by the foregoing embodiments thereof and various changes and modification may be made thereto within the scope of the invention. For instance, FIG. 1 illustrates the mode wherein the drive force applied to the front wheels 6 as the main drive wheels is distributed to the rear wheels 12 as the auxiliary drive wheels by means of the drive transmission apparatus 8. However, the invention may be practiced in a mode wherein the vehicle normally runs just as an FR vehicle with the drive transmission to the front wheels cut off but the drive force applied to the rear wheels as the main drive wheels is also distributed to the front wheels as the auxiliary wheels as required. The embodiment of FIG. 10 is arranged such that the two drive transmission apparatuses 16, 16 transmit the drive force, from the output shaft 9 via the differential mechanism 15, to the right and left drive wheels 12a, 12a. In an alternative arrangement, one of the right and left drive wheels 12a, 12a may be always connected with the differential mechanism whereas only the other drive wheel may be provided the drive transmission apparatus 16 which may be controlled for distributing the torque between the right and left drive wheels 12a, 12a.

What is claimed is:

1. A drive transmission apparatus for vehicle for distributing a drive force generated by a rotary drive source to drive wheels comprising:
    an input member applied with the drive force from the rotary drive source side;
    an output member for outputting the drive force to the drive wheel side;
    a hydraulic clutch for hydraulically carrying out drive transmission/transmission cut-off between the input member and the output member;
    an oil pump for applying a hydraulic pressure to the hydraulic clutch; and
    a sensorless brushless motor for driving the oil pump;
    wherein the oil pump has a start-up time of 0.2 seconds or less to achieve, from a stand-still state, a required level of hydraulic pressure for operating the hydraulic clutch.

2. A drive transmission apparatus for vehicle as claimed in claim 1, wherein in order that the hydraulic clutch may distribute a part of the drive force applied to main drive wheels driven by the rotary drive source to an auxiliary drive wheel, the input member is connected to the main drive wheel side and the output member is connected to the auxiliary drive wheel side.

3. A drive transmission apparatus for vehicle as claimed in claim 1, wherein the hydraulic clutch for distributing the drive force from the rotary drive source between right and left drive wheels is disposed at a respective place between the input member driven by the rotary drive source and each of the right and left drive wheels or at place between the input member and either one of the right and left drive wheels.

4. A drive transmission apparatus for vehicle as claimed in claim 1, wherein the hydraulic clutch is adjusted for drive transmission ratio by regulating the hydraulic pressure applied to the hydraulic clutch.

5. A drive transmission apparatus for vehicle as claimed in claim 4, wherein the hydraulic pressure is regulated via control of a hydraulic pressure output of the oil pump, and wherein the hydraulic pressure output of the oil pump is controlled via control of the sensorless brushless motor.

6. A drive transmission apparatus for vehicle as claimed in claim 4, wherein the hydraulic pressure is regulated via control of a hydraulic pressure output of the oil pump, and wherein the oil pump is activated when the drive transmission ratio is adjusted but is deactivated when the drive transmission ratio is not adjusted.

7. A four-wheel drive vehicle comprising:
an engine;
right- and left-front wheels applied with an engine output;
a front-wheel side differential gear for distributing the engine output between the right- and left-front wheels;
right- and left-rear wheels applied with the engine output;
a rear-wheel side differential gear for distributing the engine output between the right- and left-rear wheels;
a hydraulic clutch interposed between the front-wheel side differential gear and the rear-wheel side differential gear for adjustment of a distribution ratio of the engine output between the front and rear wheels;
an oil pump for applying a hydraulic pressure to the hydraulic clutch; and
a sensorless brushless motor for driving the oil pump;
wherein the oil pump has a start-up time of 0.2 seconds or less to achieve, from a stand-still state, a required level of hydraulic pressure for operating the hydraulic clutch.

8. A four-wheel drive vehicle as claimed in claim 7, wherein the hydraulic clutch is adjusted for the distribution ratio of the engine output between the front and rear wheels by regulating the hydraulic pressure applied to the hydraulic clutch.

9. A four-wheel drive vehicle as claimed in claim 8, wherein the hydraulic pressure is regulated via control of a hydraulic pressure output of the oil pump, and wherein the hydraulic pressure output of the oil pump is controlled via control of the sensorless brushless motor.

10. A four-wheel drive vehicle as claimed in claim 8, wherein the hydraulic pressure is regulated via control of a hydraulic pressure output of the oil pump and wherein the oil pump is activated when the distribution ratio of the engine output is adjusted but is deactivated when the distribution ratio of the engine output is not adjusted.

11. A four-wheel drive vehicle as claimed in claim 8, further comprising an additional hydraulic clutch to the hydraulic clutch for adjusting the distribution ratio of the engine output between the front and rear wheels, the additional hydraulic clutch serving to adjust a distribution ratio of the engine output between the right- and left-front wheels or between the right- and left-rear wheels.

* * * * *